United States Patent

Everett et al.

[15] 3,668,671

[45] June 6, 1972

[54] METHOD AND APPARATUS FOR READING SUPERIMPOSED MAGNETIC RECORDINGS

[72] Inventors: Larry H. Everett, Boulder, Colo.; Jack H. Judy, Minneapolis, Minn.

[73] Assignee: International Business Machines Corporation, Armonk, N.Y.

[22] Filed: Dec. 15, 1969

[21] Appl. No.: 884,880

[52] U.S. Cl. ..............................340/174.1 M, 179/100.2 CH

[51] Int. Cl. ..........................................G11b 7/28, G11b 11/10

[58] Field of Search........179/100.2 CH, 100.2 MD, 100.2 E; 340/174.1 M; 350/151

[56] References Cited

UNITED STATES PATENTS

| | | | |
|---|---|---|---|
| 3,229,273 | 1/1966 | Baaba et al. | 179/100.2 CH |
| 3,513,457 | 5/1970 | Nelson | 340/174.1 MO |
| 3,475,738 | 10/1969 | Louis et al. | 340/174.1 MO |

*Primary Examiner*—Bernard Konick
*Assistant Examiner*—Alfred H. Eddleman
*Attorney*—Hanifin and Jancin and Homer L. Knearl

[57] ABSTRACT

Superimposed tracks of magnetic recordings are read by use of a magneto-optic transducer. The recordings are on a magnetic tape which is passed in close proximity to a magnetic thin film layer coated to the reflecting side of a prism. The superimposed recordings on the tape are selectively transferred to the magnetic thin film by an external bias field. The bias field may be selectively energized or selectively positioned to enhance the transfer of one of the plurality of magnetic recordings to the magnetic thin film. The magnetic recording whose transfer is enhanced is the only recording which will be read by use of the magneto-optic effect.

4 Claims, 6 Drawing Figures

INVENTORS
LARRY H. EVERETT
JACK H. JUDY

BY Homer L. Knearl

ATTORNEY

METHOD AND APPARATUS FOR READING SUPERIMPOSED MAGNETIC RECORDINGS

BACKGROUND OF THE INVENTION

This invention relates to reading superimposed recordings from a magnetic storage medium. More particularly, the invention relates to selectively reading out superimposed, high density recordings with a magneto-optic transducing system.

In the past, superimposed recordings have been read out by utilizing magnetic heads oriented at different angles. Each read head is oriented to read the information recorded at an angle that aligns with the read-head gap. This technique has proved successful for low recording densities. Cross-talk between recordings can be minimized by orienting the recordings at 90° to each other and keeping the track density relatively low, i.e., in the order of less than 20 tracks per inch.

When the track density is increased by 100 fold up to 1,000 tracks per inch, the utilization of magnetic heads to read the tracks is not practical because of the small track width compared to the gap size of the magnetic head. To attempt to use a magnetic head to read superimposed recordings, having a density of 1,000 tracks per inch, approaches the impossible. In this environment, the magnetic head would not only see cross-talk from parallel tracks, but, also, cross-talk from superimposed recordings.

A relatively new technique for reading high density digital recordings is the use of a magneto-optic transducer. These transducers utilize either the magneto-optic Kerr Effect or Faraday Effect. Magnetic information is detected by detecting the rotation of a linearly polarized light beam after it co-acts with the information stored in the magnetic medium. However, the magneto-optic transducer has never been used to read superimposed recordings. The problems to be overcome are (1) achieving a good magneto-optic effect between the light and a plurality of superimposed magnetic recordings and (2) selecting out a particular recording from superimposed recordings.

It is an object of this invention to read superimposed magnetic recordings recorded at very high densities in the order of 1,000 tracks per inch.

It is a further object of this invention to utilize magneto optics to read superimposed magnetic recordings of high density.

It is yet a further object of this invention to selectively read out superimposed magnetic recordings with a magneto-optic transducing system.

SUMMARY OF THE INVENTION

In accordance with this invention, the above objects are accomplished by using a magneto-optic transducing system with selective transfer of magnetic recordings from a magnetic storage medium to the magneto-optic transducing system. The selective transferring of one recording in a plurality of recordings is accomplished by applying a bias magnetic field to enhance transfer of only one of the recordings.

The bias field may be provided by permanent magnetic field sources which are positioned so as to degrade or randomize the transfer of one particular recording. When permanent magnetic field sources are provided to degrade the transfer of all recordings but one, the remaining one recording appears enhanced as to its transfer to the magneto-optic transducing system. This one recording is, thus, selected out for magneto-optic transducing.

Alternatively, the bias magnetic field may be provided by magnetic field sources which must be energized to produce a field. These field sources may then be permanently positioned and selectively energized to provide a selective positioning of the bias magnetic field whereby the transfer of all but one magnetic recording is degraded and the transfer of the remaining one recording is effectively enhanced.

In addition, the objects of the invention may be accomplished by using in the magneto-optic transducer either polarized light in monitoring the rotation of polarization or by using unpolarized light in and monitoring the changes in intensity of reflected light.

The great advantage of the invention is that a great quantity of data can now be stored on magnetic tape and easily read out. One thousand tracks per inch may be recorded with one or more recordings per track, superimposed on each other. The disclosed magneto-optic transducing system is capable of selecting out each of the superimposed recordings at this high density and reading out that recording.

Another advantage is the ease with which selection of superimposed recordings may be made. The selection is simply made by changing the orientation of the bias magnetic field and, thereby, controlling the transfer of magnetic recordings from the tape to the magnetic thin film. Also, the quality of the selectivity is very high as there is very little cross-talk.

The foregoing and other objects, features and advantages of the invention will be apparent to those skilled in the art from the following more particular description of preferred embodiments of the invention as illustrated in the accompanying drawings.

DESCRIPTION

Figure 1:
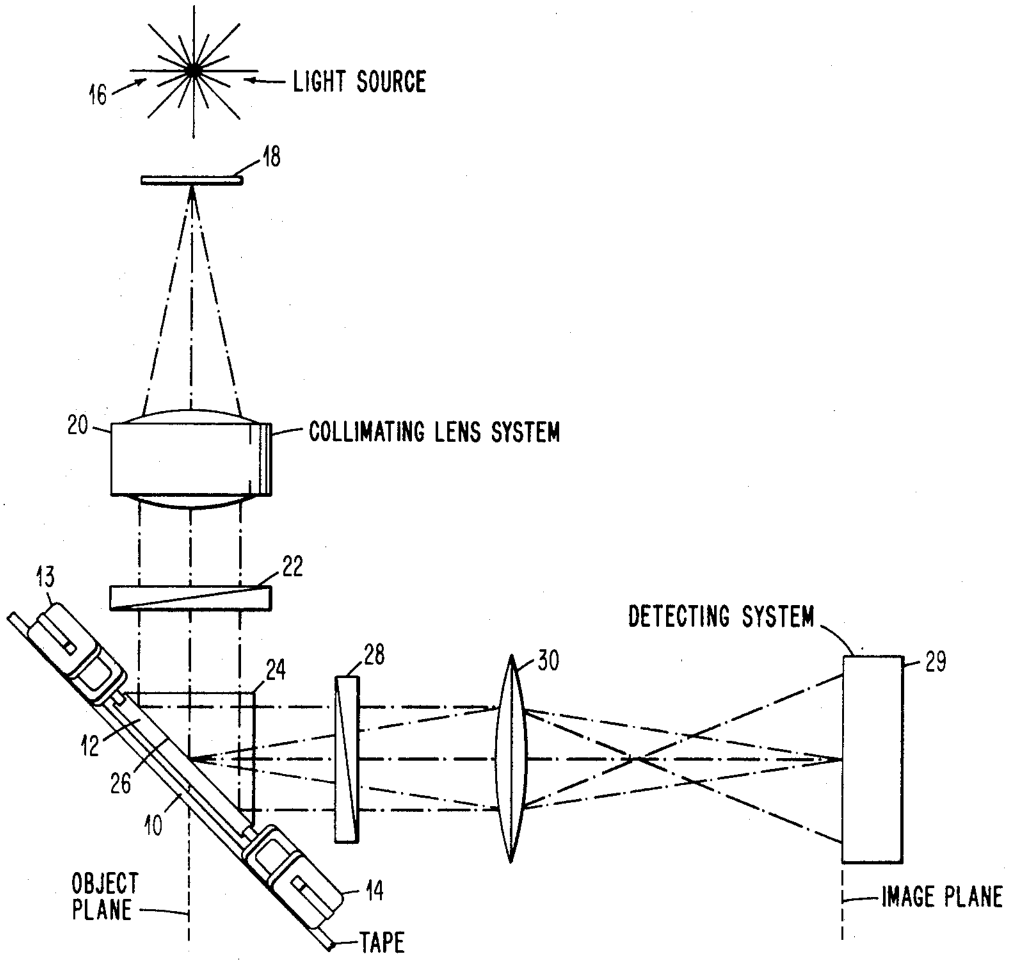
FIG. 1 is a schematic representation of one embodiment of the inventive combination of a magneto-optic transducing system wherein magnetic recordings on tape are selectively transferred to the magneto-optic transducer by means of electromagnets which are selectively energized.

Referring now to FIG. 1, in one embodiment of the invention, magnetic tape 10 is shown positioned immediately adjacent magnetic thin film 12. Tape 10 contains two superimposed recordings. Each recording is oriented 90° to the other, and both are oriented at 45° relative to the direction of motion of the tape. As will be explained hereinafter, more than two superimposed recordings may be on the tape and be selectively read out by this invention. Also, any magnetic storage medium can be used instead of tape, as for example, magnetic disks and magnetic thin films.

As discovered in co-pending, commonly assigned U.S. Pat. application, Ser. No. 861,826, entitled "Method and Apparatus for Reading Superimposed Magnetic Recordings," filed Sept. 29, 1969, now Pat. No. 3,629,517, the transfer of superimposed recordings from tape 10 to film 12 is in bulk. A bulk transfer is characterized as being a complete transfer of the superimposed recordings so that thin film 12 contains an identical recorded pattern as that on tape 10. This is accomplished by bringing tape 10 into close proximity with a magnetic thin film 12. The magnetic field from the tape 10 then transfers the recording from tape 10 onto the thin film.

As discussed briefly in the Summary of the Invention, it has been discovered that selective readout of superimposed magnetic recordings can be accomplished by selectively transferring one of the recordings from the superimposed recordings to the thin film. In other words, instead of permitting a bulk transfer, apparatus is provided for selectively transferring only one of the recordings from the tape to the magnetic thin film. In FIG. 1, the pair of electromagnets 13 and a pair of electromagnets 14 are provided. Each pair of electromagnets is oriented to provide a bias magnetic field which is aligned with one direction of the magnetic recordings and oriented 90° to the other direction of magnetic recording. By selectively energizing each pair of magnets 13 or 14, a bias magnetic field is applied across the magnetic thin film 12. This bias magnetic field in each case enhances the transfer of one of the magnetic recordings to the magnetic thin film 12. With one of the superimposed recordings transferred to the magnetic thin film 12, the next step in the procedure is to obtain an optical image of the recording. This optical image is obtained by using the magneto-optic Kerr Effect.

Light from a source 16 is acted upon by a pinhole mask 18 and a collimating lens system 20 to produce parallel beams of light. Of course, a laser could be substituted for the light source 16, mask 18 and collimating lens system 20; however, the hardware shown in FIG. 1 is chosen because of its lower cost.

The purpose of the collimating lens system is to produce the parallel rays of light so that each ray will be making the same angle of incidence with the reflecting face 26 of the prism 24. Between the prism 24 and the collimating lens system 20, is a polarizer 22. The purpose of the polarizer is to linearly polarize the light before it enters prism 24.

The light enters prism 24 and is reflected off of face 26 inside the prism. It is on the outside of face 26 of prism 24 that the magnetic thin film 12 is attached. The magnetic field produced by the recordings in the thin film 12 will act on the light reflected from face 26 in accordance with the magneto-optic Kerr Effect. Alternatively, the magneto-optic Faraday Effect could be used if there were no prism and the light was directed through the thin film 12. Also, instead of the prism 24, a transparent plate could be used; however, a prism improves the optical efficiency of the transducing operation.

The plane of polarization of the incident light beam, when reflected off of face 26 of prism 24, is rotated by the magnetic field of the recordings in thin film 12. A binary one recorded on the thin film would produce a magnetic field at face 26 of the prism which would cause the linearly polarized light to rotate a first direction. Conversely, a binary zero recorded in the thin film 12 would produce a magnetic field of the opposite direction at face 26 of prism 24. This oppositely directed magnetic field causes the linearly polarized light to rotate in a direction opposite from the first rotation. Thus, the direction of rotation of a polarized light reflected back out of prism 24 contains the magnetic information recorded in thin film 12.

Analyzer 28 is a polarizing filter oriented to pass light beams rotated in a first direction and to block light beams rotated in the opposite direction. Therefore, the pattern of light emerging from analyzer 28 will be light or no light depending upon whether light beams reflected from a given area were rotated in one direction or the other. This gives an optical black-white pattern which may be detected by a radiant energy sensing or detecting system 29.

Light from prism 24 is focussed by lens 30 onto the detecting system 29. Thus, the lens 30 is positioned so that the object plane coincides with the center of the reflecting face 26 of prism 24, while the image plane coincides with the detecting system 29. The lens 30 must have sufficient depth of field so that the entire reflecting face 26 will be in focus as projected onto the image plane 29.

Detecting system 29 may take on a variety of implementations. A piece of photographic film could be placed in the image plane. The film could later be developed and analyzed to detect the information recorded on the tape 10. Alternatively, a real time detecting system might consist of an array of photo-cells or photo-diodes, or a scanning television camera. The photo-cells, photo-diodes, or the television camera would be looking at information bit positions on reflecting face 26 which have been focussed by lens 30 onto the image plane of the detecting system 29.

Figure 2:
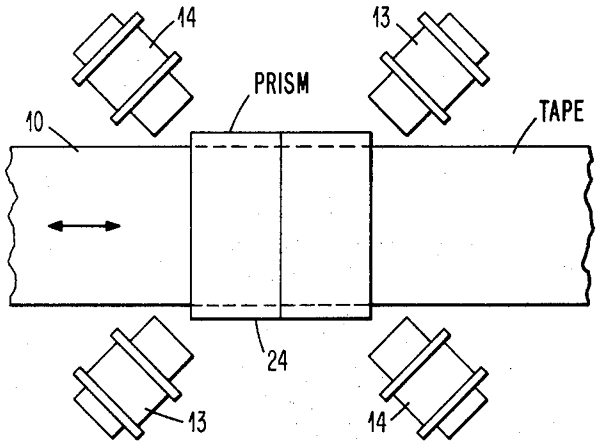
FIG. 2 shows the relative position of the electromagnets, the prism and the magnetic tape in FIG. 1.

Referring now to FIG. 2, the horizontal positioning of the electromagnets in FIG. 1 is shown. Each pair of electromagnets 13 and 14 is positioned so that it makes a 45° angle with respect to the direction of motion of tape 10 and a 90° angle with respect to each other. The recordings on the magnetic tape 10 are similarly oriented; so that, as each pair of electromagnets is energized, the field from that magnet will bias magnetic thin film 12 (FIG. 1) and, thereby, enhance the transfer of one of the superimposed recordings. This superimposed recording is, then, the only one magneto-optically read out by the apparatus in FIG. 1.

The examples described herein show two superimposed recordings oriented at 90° to each other and 45° to the direction of motion of the tape. This angular separation of the recordings is not critical. The separation can be varied from 15° to 90°. The only requirement for selective transfer is that the angular separation between recordings and the angular separation between bias fields be substantially the same; so that, bias fields and recordings can be aligned.

Figure 3A:
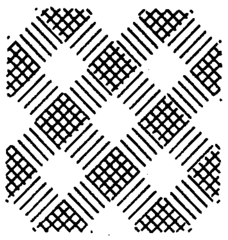
FIG. 3 shows the magneto-optic image when no bias field is applied, and there are two superimposed recordings, and, also, the magneto-optic image when the bias fields are applied alternately.
Figure 3B:
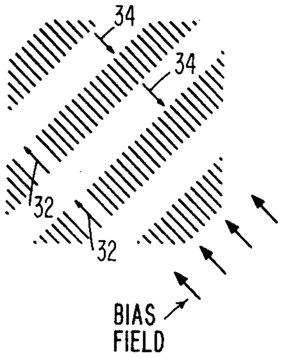
Figure 3C:
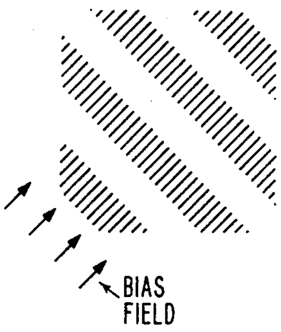

The orientation of the bias field in its relationship to the magnetic recording read out is shown in the FIGS. 3A, 3B, and 3C. FIG. 3A shows the black-white pattern from a single track on the tape when there is no bias field applied during the transfer of the recording from the tape to the thin film 12. In effect, the transfer is in bulk, and both recordings will be magneto-optically transduced to produce the black-white checkerboard pattern shown in FIG. 3A.

In FIG. 3B, one recording of the single track of FIG. 3A is shown. One pair of electromagnets is energized to produce a bias field moving from the lower right to the upper left. This bias field has the effect of enhancing the black-white pattern orthogonal to it and degrading the black-white pattern aligned with it. In effect, the black-white pattern shown represents magnetic fields recorded in thin film 12 which are oriented as shown by arrows 32 and 34. Magnetic fields oriented in these directions are enhanced by the bias field.

Conversely, the black-white pattern corresponding to the other superimposed recording is made up of magnetic field vectors oriented orthogonal to the bias field. These orthogonal field vectors tend to be randomized by the additional bias field during the transfer from tape to thin film. This has the effect of degrading the transfer of the orthogonal magnetic fields to the film 12. It should be emphasized that this appears to be the phenomenon operating in the interaction of the magnetic fields. However, it must be appreciated that the technology is in embryo state, and, thus, whereas the results described have been obtained, the exact phenomenon whereby they are accomplished is only a matter of theory and may not be actual fact.

In FIG. 3C, the other superimposed magnetic recording is selectively transferred to thin film 12 by a bias field which is directed from lower left to upper right. Again, in FIG. 3C, only one track is shown with alternate one-zero-one-zero bits recorded thereon. As would be expected from previous results with FIG. 3B, the black-white pattern which is orthogonal to the bias field is enhanced while the black-white pattern aligned with the bias field is degraded and, effectively, disappears. In this way, the other superimposed recording may be selectively transferred to film 12 and, thereafter, magneto-optically read out.

It will be appreciated by one skilled in the art that for different orientations of magnetic recording, the orientation of the bias fields might have to be varied to obtain the selective transfer of one recording to the thin film 12. Also, an alternative in detection would be to read the changes of reflectance or changes in intensity, rather than the changes in rotation of the light as it is reflected from the prism. If this latter procedure were used, then it would not be necessary to use a polarizer and analyzer. However, the detecting system would have to be insensitive to DC light levels and very sensitive to changes in light level.

It has also been determined that if more than two recordings are superimposed on a magnetic tape 10, selective transfer of a single recording for a plurality of superimposed recordings may be obtained by providing a bias field to randomize all of the superimposed recordings, except the one desired. In other words, if there were three superimposed recordings, to selectively transfer one of the recordings to the thin film 12, it is necessary to energize two bias fields oriented to degrade or randomize the transfer of two of the superimposed recordings. The remaining one superimposed recording whose transfer is not randomized is effectively enhanced and appears as the sole recording transferred to the thin film 12.

Figure 4:
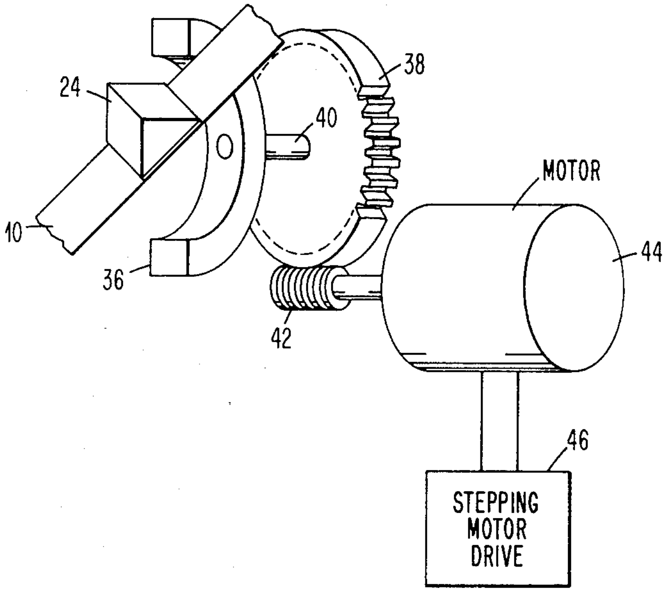
FIG. 4 shows an alternative embodiment using a permanent magnetic field source which may be positioned to provide a bias field of one orientation or another.

In FIG. 4, an alternative to the electromagnetic field source for selectively transferring recordings from tape to film is shown. This alternative consists, simply, of a permanent magnet 36 rotatably mounted under the tape 10 in prism 24. The magnet 36 is positioned such as to provide a horizontal bias field across tape 10 and thin film 12 (FIG. 1) attached to the prism 24.

It is assumed in FIG. 4 that only two superimposed recordings are on the tape 10. Thus, only one permanent magnet 36 is required to select out the recording to be transferred to the film 12. The selectivity as to which recording is transferred is accomplished simply by rotating the permanent magnet 36 until it is aligned with respect to the recordings, as shown in FIGS. 3B and 3C. The rotation of the permanent magnet 36 could be accomplished by attaching a gear 38 to the shaft 40 on which the magnet 36 rotates. Gear 38 is driven by a worm gear 42 which is, in turn, driven by a stepping motor 44. Control and actuation of the stepping motor is provided by stepping motor drive 46.

While the invention has been particularly shown and described with reference to preferred embodiments thereof, it will be understood by those skilled in the art that various changes in form and details may be made therein without departing from the spirit and scope of the invention.

What is claimed is:

1. In a magneto-optic transducer having a substrate transparent to radiant energy and a magnetic thin film coated on one surface of said substrate, selective transferring apparatus for selectively transferring one magnetic recording among a plurality of superimposed magnetic recordings from a magnetic storage medium to the thin film, said apparatus comprising:

means for transferring the superimposed magnetic recordings from the storage medium to the film;

means for selectively applying a bias magnetic field to enhance the transfer of one recording oriented in a predetermined direction whereby one magnetic recording from the plurality of superimposed magnetic recordings is selectively transferred to the film.

2. Apparatus of claim 1 wherein said means for selectively applying comprises:

a plurality of permanent magnetic field sources, the magnetic field from each source degrading the transfer of a single recording when the source is positioned in a predetermined direction with respect to the recording;

means for selectively positioning said sources to degrade the transfer of all but one of the recordings so that one magnetic recording from a plurality of superimposed recordings is selectively transferred to said film.

3. Apparatus of claim 1 wherein said means for selectively applying comprises:

a plurality of magnetic field sources, each source is normally inactive and must be energized to produce a magnetic field, each source is oriented to degrade transfer of a recording oriented in a predetermined direction when energized;

means for selectively energizing all but one of said sources so that one magnetic recording from a plurality of superimposed recordings is selectively transferred to said film.

4. Method for selectively reading one of a plurality of superimposed magnetic recordings from a magnetic storage medium comprising steps of:

transferring the magnetic recordings from a magnetic storage medium to a thin film attached to a magneto-optic transducer;

generating a plurality of bias magnetic fields, each field being oriented to randomize the transfer of one magnetic recording to the thin film;

selectively applying the bias magnetic fields to the thin film so that all recordings, but one, are randomized, and that one recording is thereby enhanced relative to the other superimposed recordings;

magneto-optically transducing the magnetic recording transferred to the thin film so that one recording of the plurality of superimposed recordings is read out.

* * * * *